Figure 1:
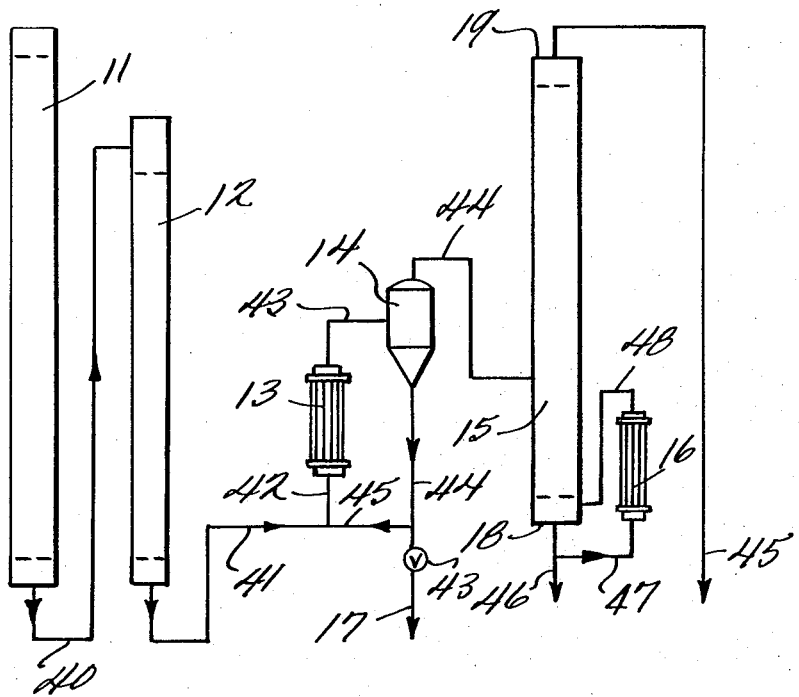

United States Patent [19]
Kabisch

[11] 3,714,342
[45] Jan. 30, 1973

[54] PROCESS FOR THE PRODUCTION OF HYDROGEN PEROXIDE

[75] Inventor: Gerhard Kabisch, Rheinfelden, Germany

[73] Assignee: Deutsche Gold-und Silber-Scheideanstalt vormals Roessier, Frankfurt (Main), Germany

[22] Filed: Sept. 2, 1970

[21] Appl. No.: 68,977

[30] Foreign Application Priority Data

Sept. 10, 1969  Germany......................P 19 45 754.6

[52] U.S. Cl. ..................423/588, 260/369, 423/589
[51] Int. Cl. .............................................C01b 15/02
[58] Field of Search ........................23/207; 260/369

[56] References Cited

UNITED STATES PATENTS

| | | | |
|---|---|---|---|
| 2,804,376 | 8/1957 | Haller et al. | 23/207 |
| 2,966,398 | 12/1960 | Jenney | 260/369 |
| 2,537,655 | 1/1951 | Daursey et al. | 23/207 |
| 2,537,516 | 1/1951 | Daursey et al. | 23/207 |

Primary Examiner—Oscar R. Vertiz
Assistant Examiner—Hoke S. Miller
Attorney—Cushman, Darby & Cushman

[57] ABSTRACT

Hydrogen peroxide low in carbon containing impurities is produced by the anthraquinone process first by water topping off (stripping) the crude $H_2O_2$ product accumulating in the extraction step of the cyclic process and then distilling the water stripped $H_2O_2$ - product.

8 Claims, 2 Drawing Figures

PATENTED JAN 30 1973 3,714,342

INVENTOR
GERHARD KABISCH
BY,
Cushman Darby & Cushman
ATTORNEYS

PROCESS FOR THE PRODUCTION OF HYDROGEN PEROXIDE

The present invention is concerned with a process for the production of a highly concentrated, low carbon hydrogen peroxide by the so-called anthraquinone process (AO-process).

It is known according to the AO-process to dissolve an anthraquinone derivative, e.g., are alkyl anthraquinone or alkyl tetrahydroanthraquinone, as the reaction carrier in a solvent and then to hydrogenate the thus obtained working solution to such an extent in the presence of a catalyst, e.g., palladium, that about 50 percent of the quinones are converted into the corresponding hydroquinones. In the next process step (oxidation step), the hydroquinone solution is treated with an oxygen containing gas, e.g., air, as a result of which the quinone is reformed while simultaneously hydrogen peroxide is formed. The hydrogen peroxide is washed out of the organic phase with water in the next process step (extraction step) and then is present as the so-called crude $H_2O_2$ in a concentration of, for the most part, about 15–30 weight percent. While the working solution is returned to the hydrogenation step whereby the cycle is closed and can be started anew the crude $H_2O_2$ in most cases is subjected to a purification and, in a given case, more highly concentrated before it is further processed or enters commerce.

Most of the usual commercial hydrogen peroxide products today have a concentration of 50–70 weight percent. In these commercial products, it is exclusively a matter of hydrogen peroxide distillates which are more or less strongly contaminated with organic materials from the AO cyclic process. The content of organic impurities in the distilled product corresponds to the analytically determined carbon value which in the 50–70 percent commercial product ranges within the boundaries of about 80–500 mg. C/l $H_2O_2$.

The production of the described commercial quality takes place in all present industrially operating processes basically similar to the process principle shown schematically in FIG. 1 of the drawings.

Figure 2:
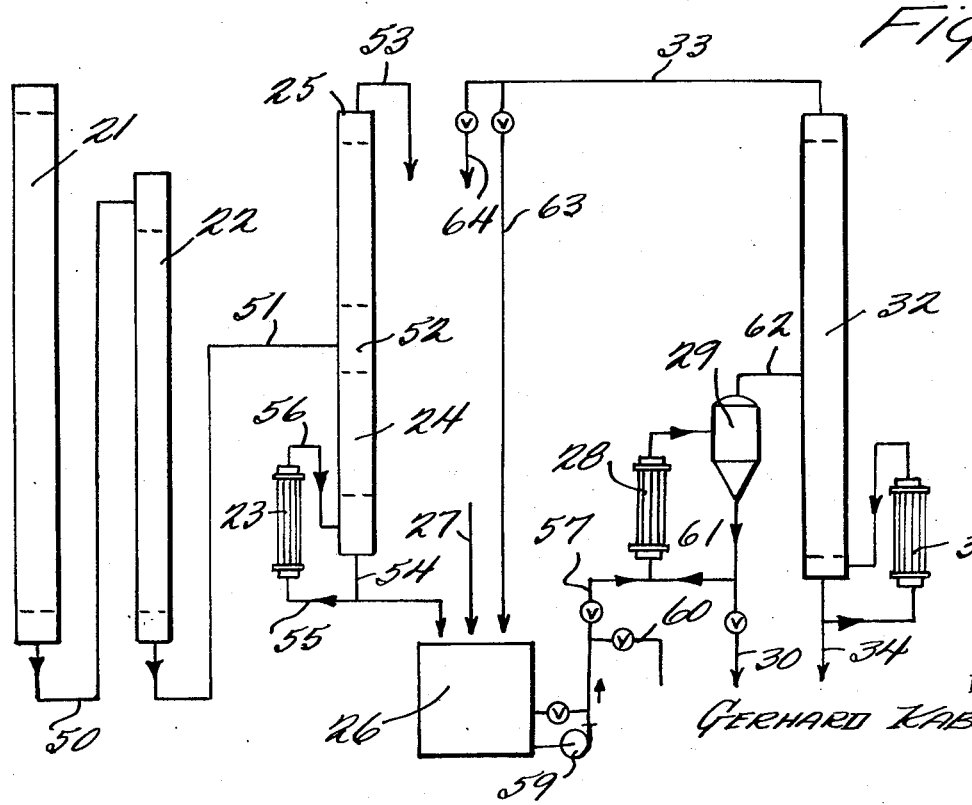

FIG. 2 shows the process according to the present invention.

Referring more specifically to FIG. 1 of the drawings, the crude $H_2O_2$ (about 15–30 percent $H_2O_2$) discharging from the bottom of the extraction column 11 goes via conduit 40 to a subsequent apparatus 12 where it is subsequently treated, for example by washing with organic solvents or by purification with adsorption agents and then flows via conduits 41 and 42 to a circulation evaporator 13 and 14 (also including conduits 43, 44 and 45) in which there is maintained a $H_2O_2$ concentration of 60–70 percent and is evaporated there. [In this regard see the equilibrium curve $H_2O_2$ concentration in the liquid and $H_2O_2$ concentration in the vapor of G. Scotchard et al, J. Amer. Chem. Soc., Vol. 74, 3715 (1952).] To prevent enrichment of the none volatile organic impurities as a safety measure there is continuously drawn off a small amount of liquid (about 3–10 percent based on the total amount of $H_2O_2$) from the circulation evaporator by way of valve 43 and conduit 17.

The $H_2O/H_2O_2$ mixture evaporated in evaporator 13, 14 goes via conduit 44 to column 15 provided with a further reboiler 16. The mixture is fractionated in the column with water taken off at the column head 19 and leaving via conduit 45 while from the column bottom 18 an about 60–70 percent $H_2O_2$ (usual commercial quality with a carbon content of 80–500 mg. C/l) is drawn off. A portion of the $H_2O_2$ is drawn off via conduit 46 and the rest recycled via conduit 47, reboiler 16 and conduit 48. In the depicted type of the customary industrial $H_2O_2$ working up by distillation it is generally valid that carbon rich $H_2O_2$ crude products yields carbon rich $H_2O_2$ distillates. Low carbon, quality $H_2O_2$ up to now could only be recovered by industrially expensive measures, as for example, a double distillation.

As low carbon products, there should be understood such qualities whose C-content in the highly concentrated distillates lies below 80 mg. C/l and especially below 50 mg. C/l. This type of low carbon quality $H_2O_2$ is often designed as "practically free of carbon", since one is in a C range in which there can no longer be determined with the usual quick methods of determination, for example coulombmetric automatic titration, whether the C content is due to organic impurities or is due to dissolved $CO_2$ (from the air). In the United States low carbon $H_2O_2$ products are designated "Food grade Quality" if the carbon content in 30 percent materials lies below 20 mg. C/l.

Surprisingly, it has now been found that there can be obtained a highly concentrated, low carbon $H_2O_2$ product that can be diluted to a "Food grade Quality" by a single distillation if there is employed as the starting product for the distillation a product first concentrated by water topping off (stripping). In comparison to a total distillation, the energy saving process of water stripping simultaneously removes with the stripped off water the main amount of the volatile organic impurities from the starting product for the distillation. The previously removed volatile organic impurities no longer contaminate the $H_2O_2$ distillate in the subsequent distillation while the nonvolatile organic impurities are removed by the distillation from the circulation evaporator 13, 14 by way of conduit 17 (FIG. 1).

The described process step of the invention then is of especial significance if the crude extraction product has a lower $H_2O_2$ concentration (for example, 15–20 weight percent), then the generally customary $H_2O_2$ concentration in the product injected into the distillation (20–30 weight percent).

Of especial importance, however, is the present invention, however, as a means of obtaining the objects of Kabisch and Wittmann application Ser. No. 69,152 filed 69,152 even date, and now abandoned, and based on German priority application 19 45 753.5. The entire disclosure of said Kabisch and Wittmann application is hereby incorporated by reference.

In the process there is produced first in the extraction step as highly as possible concentrated $H_2O_2$ crude product whereby concentrations preferably are obtained which are over 40 weight % $H_2O_2$. However, the concentration of the crude $H_2O_2$ product employed can be between 25 and 55 weight %. The thus obtained crude extraction product is then by further water stripping strengthened to concentration of over 45 percent and up to 85 %, preferably 55–75% $H_2O_2$. At the same time by the water stripping the main amount of the volatile organic compounds are removed from the $H_2O_2$ concentrate.

This $H_2O_2$ concentrate can now either be applied directly to the $H_2O_2$ distillation or it can first be diluted with water and then distilled. A direct distillation of highly concentrated $H_2O_2$ product is only possible on a basis of safety if special apparatus conditions are fulfilled (for example, carrying out the distillation in vertical film evaporators). The production of low carbon, quality $H_2O_2$ is produced in an industrially simple and safe manner if the $H_2O_2$ concentration obtained by water stripping first is diluted with water to a $H_2O_2$ content of 20–30 percent and the diluted $H_2O_2$ distilled. In contrast to the known methods of working two substantial advantages then result:

1. The amount of the carbon rich portion drawn off from the circulation evaporator can be held lower,
2. The $H_2O_2$ distillate drawn off from the bottom of the fractionating column is low in carbon.

Finally, a further illustrative form of the invention is based on the lowness of the carbon content of the $H_2O_2$ distillate. It has been pointed out that the $H_2O_2$ concentrate accumulating at the bottom of the fractionating column by insertion of a further reboiler can be brought safely to a higher concentration than 60 weight percent, preferably to a concentration between 70 and 90 percent. This type of further concentration until now was only possible by making allowance for increased safety risks because of the high carbon value of the bottom product of the fractionating column.

In the practical carrying out of the process of the invention, the distillation portion is advantageously carried out in a vacuum, e.g., 40 Torr. to 150 Torr. This portion of the invention will be explained more exactly with reference to FIG. 2. In the extraction column 21 there is produced an extract containing over 40% $H_2O_2$ which in a given case is led via conduit 50 to a further column 22 where the $H_2O_2$ extract is washed with an organic solvent. The extract is passed via conduit 51 to the middle section 52 of column 24 provided with a heater 23. The over 40% $H_2O_2$ containing extraction product is brought to an $H_2O_2$ concentration of at least 45 percent, preferably 55–75% by water stripping in column 24. While the volatile carbon is found together with water in the product coming out of the top 25 of the column and removed via conduit 53, there is contained in the $H_2O_2$ sump product collected in reservoir 26 chiefly nonvolatile carbon. This product corresponds qualitatively to the usual commercial product produced by distillation, but unlike the latter, is produced by an energy saving process and is largely free from volatile carbon compounds. A portion of the bottom product is recirculated via conduits 54, 55, reboiler 23 and conduit 56 to the lower portion of column 24.

For production of a practically carbon free quality $H_2O_2$, the concentrate in reservoir 26 is diluted with water supplied via conduit 27 and with the aid of pump 59 introduced via conduit 57 into circulation evaporator 28, 29 in which an $H_2O_2$ concentration of 50–75 percent can be obtained directly. (If dilute $H_2O_2$ is desired, it can be obtained by operating the indicated valves and allowing the dilute $H_2O_2$ to leave reservoir 26 through conduit 60 rather than conduit 57.) During the vacuum distillation, a small portion of the carbon rich sump is continuously drawn off from the circulation evaporator via conduit 30. The rest of the sump portion is recycled via conduit 61 to the circulation evaporator. The product leaving the top of evaporator 29 goes via conduit 62 to the middle of fractionating column 32 provided with a further reboiler 31. The vaporized $H_2O/H_2O_2$ mixture is separated in column 32. Both the head product removed through conduit 33 and the sump product removed through conduit 34 accumulate as low carbon condensates. While the head product, water, in a given case, can be used either entirely or partially for $H_2O_2$ dilution in reservoir 26 by passing it via conduit 63 (or can be removed via conduit 64), the $H_2O_2$ condensate drawn off via conduit 34 is a highly valuable product which qualitatively corresponds to a material which, until now, could only be obtained by a double distillation. In the described type of distillation, the $H_2O_2$ concentration in the condensate 34 corresponds to about the $H_2O_2$ concentration in circulation evaporator 28, 29. On account of the high purity of the condensate 34, there is the possibility, however, of safely adjusting this $H_2O_2$ content to a value of over 75 weight percent up to about 90 weight percent by corresponding construction of the further reboiler 31.

The process of the invention is practical with all qualities of $H_2O_2$ which are produced in the working solutions proposed until now in the anthraquinone process. Only those components can disturbingly effect the working solution which in the recycling of the anthraquinone process form large amounts of acetic acid by decomposition reactions (saponification); thus many working solutions contain as the hydroquinone dissolver methyl cyclohexanol acetate which is not very resistant to hydrolysis so that the $H_2O_2$ extraction product is contaminated with acetic acid. Even with this type of working solution, however, the process of the invention leads to increased improvement in the $H_2O_2$ quality.

The designated concentration and distillation operations of the process of the invention are preferably carried out at reduced pressure, especially between 50 and 90 Torr. In both operations, the finished product can be stabilized immediately in the column.

As reaction carriers, there can be used alkyl anthraquinones such as 2-ethyl anthraquinone, 2-butyl anthraquinone, 2-t-butyl anthraquinone, 2-isopropyl anthraquinone, 2-sec-butyl anthraquinone, 1,3-diethyl anthraquinone, 2,3-diethyl anthraquinone, 2,7-diethyl anthraquinone and partially nuclear hydrogenated derivatives thereof such as 2-ethyl tetrahydroanthraquinone and 2-butyl tetrahydroanthraquinone, as well as mixtures of such.

Especially suited for the production of a highly concentrated $H_2O_2$ crude extraction product are working solutions, which besides the named reaction carriers contain as solvents for the quinone aromatic hydrocarbons in the boiling range of about 150° 220°C. at normal pressure and as the hydroquinone solvent there are preferably employed organic phosphates or phosphonates.

Especially suitable as aromatic hydrocarbons are the benzene derivatives recovered by catalytic aromatization process out of aliphatic compounds such as trimethyl benzenes, ethyl methyl benzenes, tetramethyl benzenes or specific compounds such as t-butyl benzene or t-butyl toluene. Also, there can be used ethyl propyl benzene, 1,3-diethyl benzene, 1,4-diethyl benzene, isodurene, xylene, toluene, etc.

As organic phosphate esters or phosphonate esters especially suited are esters of aliphatic (alkyl) alcohols containing about five to nine carbon atoms. Examples of such phosphates and phosphonates include trioctyl phosphate, triamyl phosphate, tri 2-ethylhexyl phosphate, diphenyl butyl phosphate, trihexyl phosphate, triheptyl phosphate, tributyl phosphate, triisobutyl phosphate, diphenyl octyl phosphate, diphenyl cresyl phosphate, tricresyl phosphate, butyl diisoamyl phosphate, triisoamyl phosphate, tri nonyl phosphate, tris decyl phosphate, dibutyl butane phosphonate, di-t-butyl pentane phosphate, dibutyl pentane phosphonate, dipropyl hexane phosphonate, dibutyl hexane phosphonate, dipropyl heptane phosphonate, dibutyl heptane phosphonate, dibutyl octane phosphonate, dimethyl octane phosphonate, dibutyl decane phosphonate, dioctyl octane phosphonate, diphenyl benzene phosphonate, diamyl benzene phosphonate.

Unless otherwise indicated, all parts and percentages are by weight.

The invention will be further explained in accordance with the following examples.

EXAMPLE 1

With a working solution consisting of 20 grams per liter of 2-ethyl anthraquinone and 90 grams per liter of 2-ethyl tetrahydro anthraquinone aromatic gasoline in the boiling range of 180°–205°C. (quinone dissolver) and trioctyl phosphate (hydroquinone dissolver) (ratio of aromatic hydrocarbon to phosphate 75 : 25 by volume), there was formed hydrogen peroxide in the anthraquinone process cycle in a concentration of 1 weight percent of the working solution. In the extraction step of the cyclic process, the working solution was washed with water so that the $H_2O_2$ content in the aqueous phase amounted to 49 weight percent. The carbon value in the 49 percent extraction product amounted to 182 mg. C/l and was reduced after a washing with aromatic hydrocarbon (quinone dissolver from the cyclic process) to 153 mg. C/l. The washed extraction product was brought by water topping off (water stripping) in a vacuum (70 Torr) to a concentration of 70 weight percent. In the 70 percent concentrate, the carbon content amounted to 155 mg. C/l. The 70 percent concentrate was employed as the starting material used for the distillation tests described in examples 2 to 4.

EXAMPLE 2

The 70 percent concentrate described in example was fed into a 2 meter long, steam heated vertical film evaporator (25 mm in diameter). The heating was adjusted in such fashion that about 15–20 percent of the amount of fluid was drawn off from the sump of the vertical film evaporator while the remainder (80–85 percent) was vaporized. The $H_2O/H_2O_2$ vapor was led over a drop separater and separated in a subsequently connected fractionating column. The product drawn off from the bottom of the fractionating column had a $H_2O_2$ content of 84 weight percent and showed a carbon value of 38 mg. C/l.

EXAMPLE 3

The 70 percent concentrate described in example 1 was first diluted to a concentration of 25 weight % $H_2O_2$. The 25% $H_2O_2$ (380 liters per hour) was fed into a stainless steel circulation evaporator 28 which had a heating surface of about 4 square meters and was heated with steam (1.2 atmospheres absolute). From the evaporator cycle 28, 29, there was drawn off hourly an amount of 9 liters of a 70% highly contaminated $H_2O_2$ concentrate. The vaporized $H_2O/H_2O_2$ mixture separated in a fractionating column 32 filled with Raschig rings wherein there was injected into the top of the column a stabilizer solution (sodium stannate). From the bottom of the column 32, there were drawn off hourly about 108 liters of a 70% hydrogen peroxide (average carbon content 34 mg. C/l).

EXAMPLE 4

Example 3 was repeated with the difference that the further reboiler 31 located at the bottom of fractionating column 32 was so strongly heated that 78 liters of an about 90 percent $H_2O$ could be drawn off hourly from the bottom of the column (average carbon value 43 mg. C/l).

What is claimed is:

1. In a process for the production of low carbon hydrogen peroxide according to the anthraquinone process employing a working solution and wherein the $H_2O_2$ is extracted from the working solution with wash water, the improvement comprising first increasing the $H_2O_2$ content of the crude $H_2O_2$ extraction product by stripping off a part of the water and then fractionally distilling the water stripped product until the carbon content of the extraction product is reduced to below 80 mg/l, recovering water as the overhead and purified $H_2O_2$ as bottoms in said fractional distillation.

2. A process according to claim 1 in which the $H_2O_2$ concentration of the crude $H_2O_2$ extraction product is at least 30 weight percent and is increased by the water stripping to a $H_2O_2$ content of at least 35 weight percent.

3. A process according to claim 2 wherein the crude $H_2O_2$ extraction product has an $H_2O_2$ content of 40 to 55 weight percent which is increased by the water stripping to a higher value of 55 to 75 weight percent.

4. A process according to claim 3 wherein the $H_2O_2$ concentration in the solution fed to the distillation step is first adjusted by dilution to a concentration of 20–30 weight percent.

5. A process according to claim 4 wherein the distilling is carried out in a fractionating column heated at the bottom to increase the $H_2O_2$ concentration of the bottoms to about 90 percent.

6. A process according to claim 3 wherein the water stripping and distilling are carried out at a pressure of 50 to 90 Torr.

7. A process according to claim 6 wherein the working solution employed does not contain components forming large amounts of acetic acid by hydrolysis.

8. A process according to claim 7 wherein the working solution contains a hydroquinone dissolver and the hydroquinone dissolver is selected from the group consisting of phosphate esters and phosphonate esters.

* * * * *